United States Patent [19]

Tesoro et al.

[11] Patent Number: 4,656,235

[45] Date of Patent: Apr. 7, 1987

[54] SILOXANE-CONTAINING POLYIMIDE COATINGS FOR ELECTRONIC DEVICES

[75] Inventors: Giuliana C. Tesoro, Dobbs Ferry; Vinod R. Sastri, Brooklyn, both of N.Y.; Subash C. Narang, Menlo Park, Calif.

[73] Assignee: Polytechnic Institute of New York, Brooklyn, N.Y.

[21] Appl. No.: 772,785

[22] Filed: Sep. 5, 1985

[51] Int. Cl.$^4$ ............................................. C08F 122/40
[52] U.S. Cl. .................................... 526/262; 526/270; 526/279
[58] Field of Search .................... 526/262, 270, 279

[56]  References Cited

U.S. PATENT DOCUMENTS

| | | | |
|---|---|---|---|
| 2,890,206 | 6/1959 | Kraiman | 260/63 |
| 2,890,207 | 6/1959 | Kraiman | 260/78 |
| 2,971,944 | 2/1961 | Chow et al. | 260/78 |
| 3,325,450 | 6/1967 | Holub | 260/46.5 |
| 3,338,859 | 8/1967 | Green | 260/30.2 |
| 3,435,003 | 3/1969 | Craven | 260/47 |
| 3,740,305 | 6/1973 | Hoback et al. | 161/183 |
| 4,030,948 | 6/1977 | Berger | 528/28 |
| 4,118,377 | 10/1978 | D'Alelio | 526/236 |
| 4,343,927 | 8/1982 | Chang | 526/262 |
| 4,395,527 | 7/1983 | Berger | 528/26 |
| 4,480,009 | 10/1984 | Berger | 428/447 |
| 4,499,149 | 2/1985 | Berger | 428/447 |
| 4,520,075 | 5/1985 | Igarashi et al. | 428/435 |

FOREIGN PATENT DOCUMENTS 584014  1/1978  U.S.S.R.

OTHER PUBLICATIONS

Maudgal & St. Clair, *Preparation and Characterization of a Siloxane Containing Bismaleimide*, Proceedings 29th Nat'l SAMPE Symposium 437 (Apr. 3–5 1984).

Babu, *Silicon-Modified Polyinides: Synthesis and Properties*, in Polyimides—Synthesis and Characterization 51 (K. Mittal ed. 1984) (Plenum Press, N.Y.).

Berlin et al., *Poly(Aroylene–Bisbenzimidazoles) and Polyimides Based on Aromatized Adducts of Bisfurans with Maleic Anhydride*, J. Macromol Sci.-Chem. 1 (1977).

Sheppard et al., *Fabrication of PDA/HTS Prototype Components*, 8 Nat'l SAMPE Tech. Conf. (Bicent. Mater.) 257 (1976).

Boyd and Heatherington, *Synthesis and Reactions of 2-(Dialkyamino) Furans*, 80 Chem. Abst. 47738p at 339 (1974).

Mikhailove et al., *Polyadducts of Certain Difuran Derivatives*, 66 Chem. Abst. 11222n at 1113 (1967).

Dr. Giuliana Tesoro Memo dated Jun. 19, 1985–4 pages.

*Primary Examiner*—Harold D. Anderson
*Attorney, Agent, or Firm*—David H. Semmes; Warren E. Olsen

[57]  ABSTRACT

Siloxane-containing polyimides, useful as conformal coatings for electrical devices, can be synthesized via a novel Diels-Alder reaction in which bis-maleimide derivatives are polymerized with siloxane-containing bisfuran derivatives. The Diels-Alder adduct can be aromatized, and applied as a coating to a mineral substrate. The aromatized, polyimide coating can be cured thermally without additional cyclization on the substrate.

10 Claims, No Drawings

SILOXANE-CONTAINING POLYIMIDE COATINGS FOR ELECTRONIC DEVICES

BACKGROUND OF THE INVENTION

1. Field of the Invention

The present invention relates to the production and use of siloxane-containing polyimides, useful as conformal coatings for electrical devices. The polyimides of the present invention are synthesized in a novel Diels-Alder reaction by polymerizing bismaleimide and siloxane-containing symmetrical bis-furan derivatives, and aromatizing the resulting Diels-Alder intermolecular addition product.

2. Description of the Prior Art

The prior art illustrates various attempts to synthesize effective and efficient polyimide coatings for electrical devices. KRAIMAN, U.S. Pat. Nos. 2,890,206, 2,890,207, and CHOW, et al., U.S. Pat. No. 2,971,944 disclose the synthesis of polyimides by the Diels-Alder reaction of bis-maleimides with some dienes, but not with bis-furan derivatives. The polymers obtained from these reactions lack the aromatic structure required for high thermal stability, and the molecular features, such as polydimethyl siloxane segments, needed to impart the requisite flexibility to films and coatings. References that do disclose Diels-Alder syntheses of polyimides from bis-furans do not disclose the use of siloxane-modified monomers or polymers. Such references include C. Sheppard, et al., *Fabrication of PDA/HTS Prototype Components*, 8 Nat'l SAMPE Tech. Conf. (Bicent. Mater.) 257–73 (1976); A. Berlin et al., *Poly(aroylene-bis-benzimidazoles) and Polyimides Based on Aromatized Adducts of Bisfurans with Maleic Anhydride*, AII (1) J. Macromol. Sci.-Chem. 1–28 (1977); AS U.S.S.R. Chem Phys., U.S.S.R. Inventor's Certif. No. SU-584014; M. Mikhailov et al., *Polyadducts of Certain Difuran Derivatives*, 66 Chem. Abst. 11222n at 1113 (1967); and G. Boyd and K. Heatherington, *Synthesis and Reactions of 2-(dialkylamino) furans*, 80 Chem. Abst. 47738p at 339 (1974). Thus, in the production of so-called "addition polyimides" via polymerization of maleimide-capped oligomers or Diels-Alder reaction of bismaleimides with dienes, the prior art fails to disclose siloxane-containing reactive dienes of suitable structure. Instead, siloxane-modified addition polyimides have been prepared using siloxane-containing bis-maleimide oligomers such as those disclosed in S. Maudgal and T. St. Clair, *Preparation and Characterization of a Siloxane Containing Bismaleimide*, Proc. 29th Natl SAMPE Symp. 437–45 (Apr. 3–5 1984). No prior art reference discloses the novel addition polyimides of the present invention, which are produced from polydimethylsiloxane-containing bis-furan derivatives polymerized in a Diels-Alder reaction with bis-maleimides that only optionally contain siloxane segments.

A second widely disclosed class of polyimides, designated as "condensation polyimides," are generally prepared from dianhydrides of tetracarboxylic aromatic acids and diamines via a polyamic acid, or polyamic ester, intermediate. Such condensation polyimides initially may incorporate siloxane segments in a dianhydride, a diamine compound that may be used as a monomer or comonomer in the polycondensation reaction, or both. References disclosing siloxane-containing condensation polyimides include BERGER, U.S. Pat. Nos. 4,030,948; 4,395,527; 4,480,009, and 4,499,149; G. Babu, *Silicon-Modified Polyimides: Synthesis and Properties*, in *Polyimides—Synthesis and Characterization* 51–66 (K. Mittal ed. 1982); IGARASHI, U.S. Pat. No. 4,520,075, and HOBACK, U.S. Pat. No. 3,740,305. These references, disclosing silicon-modified condensation polyimides, do not disclose the use of siloxane-containing bis-furans to form silicon-modified addition polyimides.

The objective of the present invention is to provide a versatile process for attaining optimal balances of the properties essential for effective and efficient processing and performance of polyimides used as conformal coatings for electrical devices. By synthesizing siloxane-modified polyimides via the Diels-Alder reaction of bis-maleimides and polydimethyl-siloxane-containing bis-furans, the present invention provides an improved technique for controlling the balance of properties essential for polyimide coatings, including solubility, thermal curability without formation of undesirable by-products, thermo-oxidative stability of cured polymers, electrical properties, moisture resistance, flexibility, and adhesion to substrates.

The present invention solves problems that plagued Polyimide conformal coatings made according to prior-art processes. Specifically, condensation polyimides often are applied to substrates as intermediates, and then cyclized or imidized directly on the substrate. Cyclization of films on the substrate and the necessary synchronization with curing cycles increases the formation of pinholes and undesirable by-products in the cured film. In contrast, the polyimides of the present invention are applied to substrates as fully aromatized end-products, and cured solely by thermal means. By obviating the need to polymerize or cyclize compounds on the substrate, the present invention reduces the incidence of structural and chemical defects in the cured polyimide film.

The present invention also provides an exceptional means for tailoring siloxane-modified polyimide macromolecules to meet the exacting requirements of truly conformal coatings capable of covering the complex geometries of electrical devices. By synthesizing polyimides using the siloxane-containing bis-furan monomers of the present invention, it is possible to control the length of the polydimethyl siloxane segments and, thus, attain a desired flexibility and solubility in the resulting polymer films. Significantly, the present invention also provides for the use of bis-furan monomers in which the silicon atom is linked directly to an aromatic group; this configuration improves the thermal stability of polyimide films. Finally, the structure of the bis-maleimide may also be varied to provide additional opportunities for controlling the properties of the resultant polymer.

SUMMARY OF THE INVENTION

Although investigators have developed various means for producing silicon-modified polyimides, there remained a need to design a highly versatile process for tailoring polymers to meet the specific requirements for electronic applications of polyimide coatings. The object of this invention is, thus, to provide a means for crafting siloxane-containing polyimide films that exhibit superior properties as conformal coatings for electrical devices. The present invention allows for the directed modification of polyimide coatings to improve solubility, curability, thermo-oxidative stability, electrical properties, moisture resistance, and adhesion to substrates. A particularly important objective of this invention is to provide a siloxane-modified polyimide that can be applied to substrates as a fully aromatized polymer, curable solely by thermal means without additional cyclization on the substrate. This aspect of the present invention retards the formation of structural (e.g., pinholes) and chemical (e.g., noxious by-products of curing process) defects in the cured film.

The present invention achieves these objectives by preparing polyimides via a novel Diels-Alder intermolecular polymerization of bis-maleimides and previously unreported siloxane-containing bis-furan derivatives, and aromatizing the Diels-Alder adducts. The novel polymers resulting from this process may be designed to meet the exacting needs of truly conformal coatings for mineral substrates, such as silicon, silica, and mineral oxides, used in electronic devices.

DETAILED DESCRIPTION OF THE INVENTION

A novel class of polyimides of particular value as conformal coatings for electronic devices can be made using previously unreported symmetrical siloxane-containing bis-furans. According to the present invention, siloxane-containing polyimide polymers are made via intermolecular polymerization of bis-maleimide dienophiles and siloxane-containing bis-furan dienes, followed by aromatization of the intermediate Diels-Alder adduct. More specifically, bis-furans of the general formula:

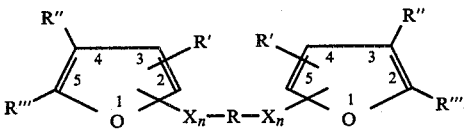

are polymerized in a Diels-Alder reaction with bis-maleimides of the general formula:

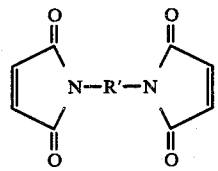

to form a nonaromatic Diels-Alder adduct of the general formula:

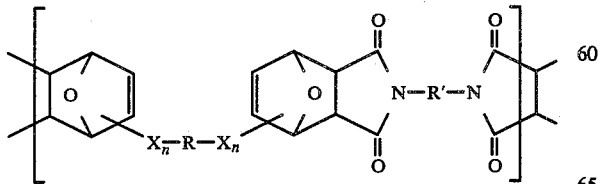

This Diels-Alder adduct is then aromatized to form a polyimide polymer of the general formula:

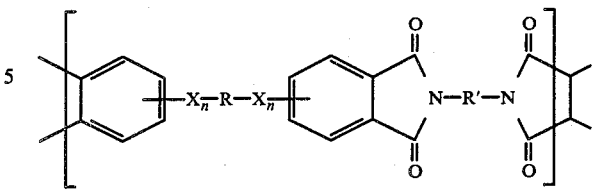

For each of the above chemical structures, $X_n$ is a divalent bridging group linked through position 2 or 3 of the furan rings, where $n=0$ or 1; each R', R" and R''' can be hydrogen or a hydrocarbon radical of 1 to 6 carbon atoms, and R is a polydimethyl siloxane segment of the general formula:

where $m=1-10$, and R' is a divalent group of four or more carbon atoms that optionally contains R units.

Examples of bis-furan derivatives useful for forming silicon-containing polyimides include N,N'(2,5-dimethyl-3-furoyl)-1,3-bis(aminopropyl)tetramethyldisiloxane, 1,3-Bis(3-furyl)tetramethyldisiloxane, 1,5-Bis(3-furyl)-hexamethyltrisiloxane, and 1,7-Bis(3-furyl)octamethyltetrasiloxane. The potential for crafting a variety of specific bis-furan derivatives is a significant aspect of the invention that allows for directed control over the properties of the final polyimide product. For example, the bis-furan derivatives may contain a polydimethylsiloxane segment of varying length, as well as an optional divalent bridging group attached to the furan rings. In some preferred embodiments, the bis-furan derivative lacks a bridging group, and the terminal silicon atoms of the siloxane segment directly contact the furan rings. Upon aromatization of the final polymer product, the direct relationship between the silicon and the aromatic groups increases the thermo-oxidative stability of the cured polymer film. Additionally, the bis-maleimide monomers may be varied to provide further opportunities for tailoring specific polymer films. The bis-maleimides of this invention contain a divalent group of four or more carbon atoms, that may optionally include a polydimethyl siloxane segment. Examples of useful bis-maleimide monomers include compounds of the general structure:

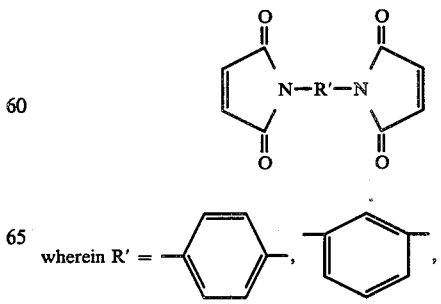

wherein R' =

-continued $+CH_2\dot{)}_{\overline{n}}$ with n = 2–36, or

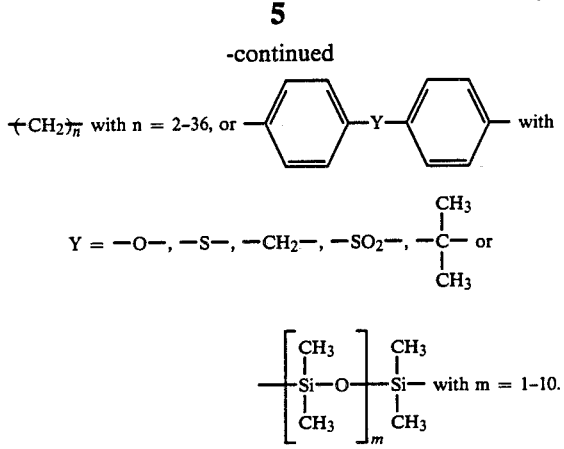

$Y = -O-, -S-, -CH_2-, -SO_2-, -\underset{\underset{CH_3}{|}}{\overset{\overset{CH_3}{|}}{C}}-$ or $\left[\begin{array}{c}CH_3\\|\\-Si-O-\\|\\CH_3\end{array}\right]_m \begin{array}{c}CH_3\\|\\-Si-\\|\\CH_3\end{array}$ with m = 1–10.

The bis-maleimide and bis-furan derivatives are polymerized via a Diels-Alder reaction. Equimolar amounts of each monomer are mixed with an inert solvent, such as dry tetrahydrofuran (THF), refluxed at 60–80 degrees C. for 5–10 hours (or until polymerization is completed), cooled, and poured into methanol to precipitate the nonaromatized polyimide polymer. In one embodiment of the invention, the bisfuran, bis-maleimide, and THF are refluxed under nitrogen. The Diels-Alder adduct is then aromatized in presence of acid—for example by heating for 2 hours at the reflux temperature in acetic anhydride or glacial acetic acid. The aromatized polymer is precipitated in water, filtered, and dried.

The siloxane-containing polyimides of the present invention provide fully aromatized conformal coatings for electrical devices that do not require cyclization on the substrate. Polymer films can be cast effectively from a 10–30% (w/w) solution of polymer and liquid tetrahydrofuran. Spin-coating the polyimide in a dimethyl acetamide solution has also produced clear and uniform coatings with good adhesion on both glass and silicon substrates. Once applied to the substrate, the films are kept at room temperature for approximately 5 hours, and cured in a vacuum oven, under a set of conditions selected from the workable range extending from overnight (15 hours) at 100 degrees C. to 30 minutes at 350 degrees C. in air, in a vacuum oven or in nitrogen. Films cured at 175 degrees C. for 90 minutes were stiffer, a little darker, and almost completely insoluble in most common solvents.

The following examples describe the mode for practicing the present invention in greater detail. Examples 1–4 illustrate the best mode known to the inventor for synthesizing symmetrical siloxane-containing bis-furans useful as dienes in the Diels-Alder synthesis for polyimides. Examples 5–16 illustrate the mode for synthesizing fully aromatic, siloxane-containing polyimides via a Diels-Alder reaction of bis-furans and bis-maleimides.

EXAMPLE 1

Synthesis of N,N'-Bis(2,5-dimethyl-3-furoyl)-1,3-Bis(3-aminopropyl)-tetramethyldisiloxane Twelve (12) ml of n-butyl lithium (1.55M in hexane) were transferred, via a syringe, to one-necked, round-bottomed flask, under nitrogen, equipped with a magnetic stirrer. Ten (10) ml of dry tetrahydrofuran (THF) were then added to the flask. The resulting solution was cooled to −78 degrees C. and 2.485 g of 1,3-Bis(3-aminopropyl)-1,1,3,3-tetramethyl disiloxane (BADS) in 10 ml dry THF were added dropwise under nitrogen. Once the addition of the BADS was complete, the solution was allowed to warm up to room temperature, and stirred for 1 hour. The solution was then cooled to −78 degrees C., and 3.083 g of methyl-2,5-dimethyl-3-furoate (MDF) in 10 ml dry THF were added under nitrogen. The solution was then warmed to 50 degrees C. and stirred for 24 hours. The stirred solution was cooled to room temperature and poured into 50 ml cold water. 2.5 ml of conc. HCl was then added and the solution was stirred well. The organic layer was separated, and the aqueous layer extracted with 3×10 ml ether. The organic layers were combined, dried using anhydrous Na2SO4, and filtered. The solvents were then removed in vacuo, to give a dark, orange-red, viscous liquid. The reaction yield was 2.95 g, or 60% of the theoretical.

EXAMPLE 2

Synthesis of 1,3-Bis(3-furyl)-tetramethyl disiloxane

Fifty (50) ml of n-butyl lithium (1.55 in hexane) were transferred via a syringe to a one-necked, round-bottomed flask, under nitrogen, equipped with a magnetic stirrer. Ten (10) grams of 3-Bromofuran in 10 ml of dry tetrahydrofuran (THF) were then added dropwise under nitrogen. Once this addition was complete, the resulting solution was stirred at −78 degrees C. for 1 hour. A pale yellow precipitate formed, and 6.5 g of 1,3-dichlorotetramethyl disiloxane in 10 ml dry THF were then added dropwise at −78 degrees C. under nitrogen. The precipitate slowly disappeared. The solution was then stirred for 4 hours at −78 degrees C.

The solvents were removed using a vacuum pump, not allowing the temperature to exceed zero degrees C. A pale orange solid remained. Twenty-five (25) ml of hexane were added to this solid, followed by 30 ml of water containing 5 ml concentrated HCl. The organic layer was removed. The aqueous layer was extracted once with 20 ml hexane and twice with 20 ml each of ether. The organic layers were mixed, dried using anhydrous Na2SO4, and filtered. The solvents were removed in vacuo to give 8.8518 grams, 97.9%, of a pale orange liquid. The crude product was distilled at 160 degrees C. and 10 mm Hg to give 7.54 grams of a pale yellow liquid.

EXAMPLE 3

Synthesis of 1,5-Bis(3-furyl)-hexamethyl trisiloxane

Twenty-two (22) ml of n-butyllithium (1.55M in hexane) and 5 ml dry tetrahydrofuran (THF) were added under nitrogen to a 250 ml round-bottomed flask equipped with a magnetic stirrer. The solution was cooled to −78 degrees C. Five (5) grams of 3-Bromofuran in 10 ml dry THF were then added dropwise under nitrogen, with constant stirring. The solution was stirred for 1 hour upon which a slurry formed. 4.718 g of 1,5-dichlorohexamethyl trisiloxane in 10 ml dry THF were then added dropwise under nitrogen. The solution was then stirred for 4 hours, during which time it was allowed to come to room temperature. The solution was poured into 30 ml of water containing 3 ml conc. HCl. The organic layer was removed, and the aqueous layer extracted with 3×20 ml portions of ether. The organic layers were combined, dried using anhydrous Na2SO4, and filtered. The solvents were removed in vacuo, to give 4.2 g of an orange liquid.

EXAMPLE 4

Synthesis 1,7-Bis(3-Furyl)-octamethyl tetrasiloxane

The same procedure as Example 3 was followed using 22 ml of n-butyl lithium, 5 g of 3-bromofuran and 5.9 g of 1,7-dichloro octamethyl tetrasiloxane, to give 4.81 g of an orange viscous liquid.

EXAMPLE 5

Synthesis of a polyimide polymer from N,N'-Bis(2,5-dimethyl-3-furoyl)-1,3-bis(3-aminopropyl)-tetramethyldisiloxane and N,N'-Bismaleimido-4,4'-diphenylmethane 1.2319 g (25 mmol) of the bis-furan of Example 1 in 5 ml of dry tetrahydrofuran (THF) were mixed with 0.8959 (25 mmol) of the bis-maleimide in 5 ml dry THF in a 50 ml round-bottomed flask equipped with a magnetic stirrer. The solution was refluxed at 70 degrees C. under nitrogen for 7 hours, cooled to room temperature and poured into excess 50:50 H₂O:MeOH (v/v). The orange precipitate so formed was filtered and dried to give 1.2768 g, 60% yield, of the following polymer:

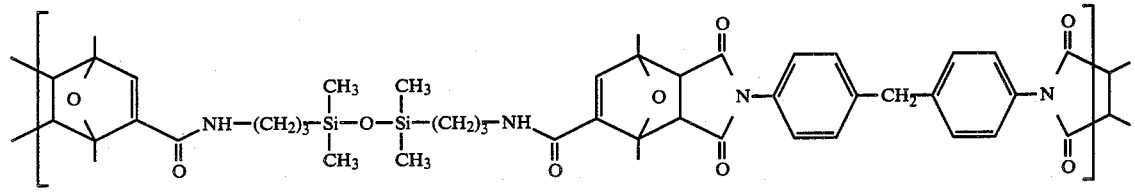

This polyimide polymer has a molecular weight of 50,000 and onset of decomposition temperature in TGA (N₂) (thermogravimetric analysis, Nitrogen, 20 degrees C./minute)=408.6 degrees C.

EXAMPLE 6

Aromatization of the polymer from Example 5

One (1) gram of the polymer from Example 5 was refluxed in 1 ml acetic anhydride for 2 hours, and then poured into cold water. The precipitate was filtered and dried in a vacuum oven at 50 degrees C., to give 0.9981 g of the following aromatized polymer with a MW=50,000 and onset of decomposition temperature in TGA (N₂)=465 degrees C.:

EXAMPLE 7

Synthesis of a polyimide polymer from N,N'-Bis(2,5-dimethyl-3-furoyl)-1,3-bis(3 aminopropyl)-tetramethyldisiloxane and N,N'-bismaleimido-1,6-hexanediamine 1.2319 g (25 mmol) of the bis-furan of Example 1 in 5 ml THF and 0.6907 g (25 mmol) of the bis-maleimide in 5 ml of dry THF were polymerized following the procedure of Example 5, to give 7.25 g, 65% yield, of a polymer with a MW=30,000 and onset of decomposition temperature in TGA(N₂)=351 degrees C.

EXAMPLE 8

Aromatization of the polymer from Example 7

One (1) gram of the polymer from Example 7 was placed in 1 ml of acetic anhydride and aromatized following the procedure of Example 6, to give 0.983 g of the following polymer with a MW=30,000, and onset of decomposition temperature in TGA(N₂)=415 degrees C.:

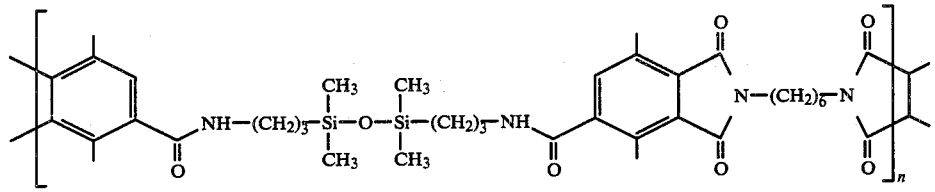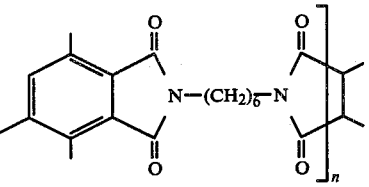

EXAMPLE 9

Synthesis of a polyimide polymer from N,N'Bis(2,5-dimethyl-3-furoyl)-1,3-bis(3-aminopropyl)-tetramethyldisiloxane and N,N'(bismaleimido)-1,3-(bisaminopropyl)tetramethyl disiloxane 1.2319 g (25 mmol) of the bis-furan of Example 1 in 5 ml THF and 1.0203 g (25 mmol) of bis-maleimide in 5 ml THF were copolymerized as in Example 5, to give 1.351 g, 60% yield, of a polymer with a MW=30,000 and onset of decomposition temperature in TGA (N₂)=300 degrees C.

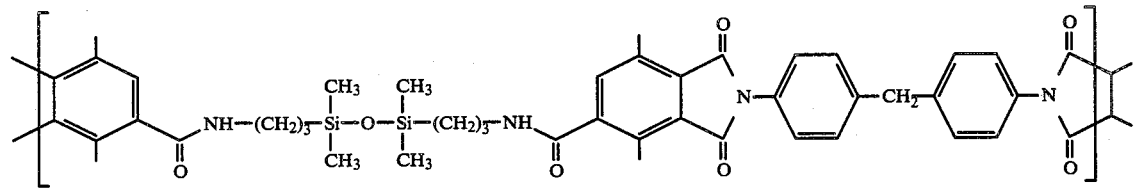

EXAMPLE 10

Aromatization of the polymer from Example 9

One (1) gram of the polymer from Example 9 was placed in 1 ml acetic anhydride and aromatized as in Example 6, to give 0.95 g of the following polymer with a MW=30,000 and onset of decomposition in TGA(N$_2$)=313 degrees C.:

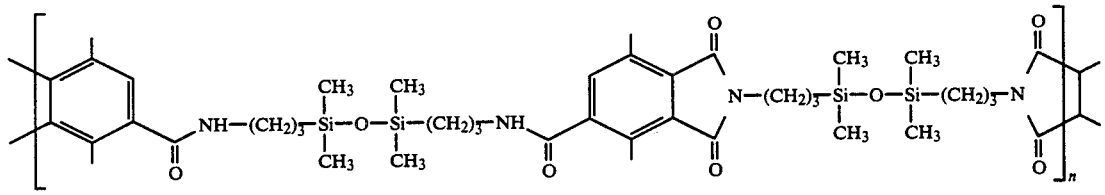

EXAMPLE 11

Synthesis of a polyimide polymer from 1,3-Bis(3-furyl)tetramethyldisiloxane and N,N'-bismaleimidodiphenyl methane 0.6661 g (25 mmol) of the bis-furan of Example 2 in 5 ml THF and 0.8959 g (25 mmol) of bis-maleimide in 5 ml THF were mixed together and refluxed at 70 degrees C. for 5 hours. The solution was then cooled and poured into methanol, giving a pale yellow precipitate containing 1.203 g, 77% yield, of a polymer with a MW=15,000 and onset of decomposition temperature in TGA(N$_2$)=415 degrees C.:

EXAMPLE 12

Aromatization of the polymer from Example 11

One (1) gram of polymer from Example 11 and 1 ml acetic anhydride were refluxed for 2 hours. The solution was then poured into water to precipitate the polymer. The precipitate was filtered and dried, to give 0.983 g of the following polymer with a MW=15,000 and onset of decomposition temperature in TGA(N$_2$)=468 degrees C.:

EXAMPLE 13

Synthesis of a polyimide polymer from 1,3-Bis(3-furyl)tetramethyldisiloxane and N,N'-bismaleimido 1,6-hexanediamine 0.6661 g (25 mmol) of the bis-furan of Example 2 in 5 ml THF and 0.6907 g (25 mmol) of the bis-maleimide in 5 ml THF were copolymerized as in Example 11, to give 0.985 g, 73% yield, of a yellow solid with a MW=20,000 and onset of decomposition temperature in TGA(N$_2$)=388 degrees C.

EXAMPLE 14

Aromatization of the polymer from Example 13

One (1) gram of the polymer from Example 13 as aromatized as in Example 12, to give 0.91 g of the following polymer, with a MW=20,000. The onset of decomposition temperature in TGA was (N$_2$)=421 degrees C.:

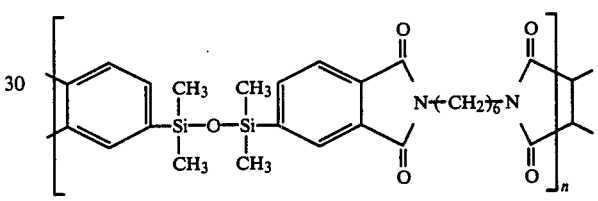

EXAMPLE 15

Synthesis of a polyimide polymer from 1,3-Bis(3-furyl)tetramethyldisiloxane and N,N'-bismaleimido-1,3(bisaminopropyl)tetramethyl disiloxane 0.6661 g (25 mmol) of bis-furan in 5 ml THF and 1.0203 g (25 mmol) of the bis-maleimide in 5 ml THF were copolymerized as in Example 11, to give 1.01 g, 60% yield, of a polymer with a MW=18,000 and onset of decomposition in TGA(N$_2$)=300 degrees C.

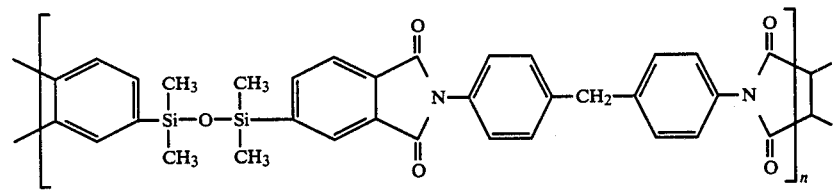

EXAMPLE 16

Aromatization of the polymer from Example 15

One (1) gram of the polymer from Example 15 was aromatized as in Example 12, to give 0.95 g of the following polymer, with a MW=18,000 and onset of decomposition in TGA(N$_2$)=330 degrees C.:

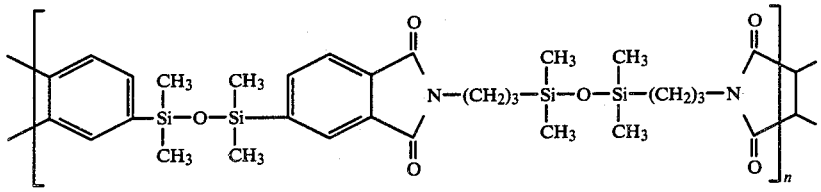

Tables 1 and 2 further illustrate the properties of the polyimides formed according to the present invention.

Predictably, glass transition temperature ($T_g$) and thermal stabilities ($T_d$) are higher for the aromatized

TABLE 1

COMPARATIVE PROPERTIES OF AROMATIZED AND UNAROMATIZED POLYIMIDES PRODUCED FROM THE DIELS-ALDER REACTION OF THE SILOXANE-CONTAINING BIS-FURANS AND BIS-MALEIMIDES DESCRIBED IN EXAMPLES 5-16

| Polymers | MW[1] (GPC) | TGA[2] 20° C./ min. $T_d(N_2)$ | $T_g(N_2)$ 10° C./ min. | Volume[3] Resistivity ohm·cm | Wet[4] Adhesion (Mil 6301) | % Moisture Uptake 95% rel. hum. | % Moisture Uptake 52% rel. hum. | Water[5] Permeability (ASTM D1653) g/24 hr. Rate of Transmission Before Cure | Water[5] Permeability (ASTM D1653) g/24 hr. Rate of Transmission After Cure | Solubility[6] (% Solids) THF | Solubility[6] (% Solids) DMAc | Solubility[6] (% Solids) DMF | Film Properties |
|---|---|---|---|---|---|---|---|---|---|---|---|---|---|
| (Unaromatized) | | | | | | | | | | | | | |
| Example 5 | 50,000 | 408.6 | 82 | $10^{17}$ | P | 5.1 | 0.6 | 0.51 | 0.202 | | | | Tough, slightly brittle |
| Example 7 | 30,000 | 351.5 | 68 | $10^{17}$ | P | 5.8 | 0.53 | 0.499 | 0.13 | | | | Fairly flexible |
| Example 9 | 30,000 | 300 | 21 | $10^{16}$–$10^{17}$ | P | 4.8 | 0.41 | 0.254 | 0.117 | | | | Flexible |
| Example 11 | 15,000 | 415 | 101 | $10^{17}$ | P | 5.0 | 0.5 | 0.15 | 0.099 | | | | Tough, slightly brittle |
| Example 13 | 20,000 | 388 | 96 | $10^{16}$–$10^{17}$ | P | 4.6 | 0.6 | 0.11 | 0.061 | | | | Fairly flexible |
| Example 15 | 18,000 | 300 | 55 | $10^{16}$–$10^{17}$ | P | 4.2 | 0.4 | 0.002 | 0.029 | | | | Flexible |
| (Aromatized) | | | | | | | | | | | | | |
| Example 6 | 50,000 | 465 | 97 | $10^{17}$ | P | 5.0 | 0.51 | .48 | .113 | 40 | 50 | 50 | Tough |
| Example 8 | 30,000 | 415 | 75 | $10^{17}$ | P | 5.6 | 0.5 | .431 | .08 | 45 | 53 | 58 | Flexible |
| Example 10 | 30,000 | 313 | 53 | $10^{16}$–$10^{17}$ | P | 4.0 | 0.38 | .207 | .044 | 50 | 60 | 55 | soft, flexible |
| Example 12 | 15,000 | 468 | 104 | $10^{17}$ | P | 4.7 | 0.48 | .133 | .087 | 38 | 50 | 53 | Tough, brittle |
| Example 14 | 20,000 | 421 | 97 | $10^{16}$–$10^{17}$ | P | 4.6 | 0.6 | .100 | .045 | 40 | 45 | 43 | Fairly flexible |
| Example 16 | 18,000 | 330 | 76 | $10^{16}$–$10^{17}$ | P | 3.91 | 0.3 | .057 | .019 | 45 | 51 | 53 | Flexible |
| CIBA GEIGY XU-218 | — | 524 | — | $10^{17}$ | F | — | 0.8 | .215 | — | Sol. | Sol. | Sol. | — |

[1] GPS - THF; ( -Styragel $10^4$, $10^3$, 500, 100A); 1 ml/min.
[2] Thermogravimetric analysis (Nitrogen, 20° C./minute) measuring onset of decomposition temperatures ($T_d$)
[3] Measured using a Kiethly Electrometer at 65% relative humidity and 25 C. under vacuum
[4] P = Passed, F = Failed. Test conducted in cold water for 24 hours
[5] Divided by 2.5 (to present results in g/cm² /24 hr.) Film cured at 175° C. for 90 minutes
[6] THF = tetrahydrofuran, DMAc = N,N—Dimethylacetamide, DMF = N,N—Dimethylformamide

TABLE 2

Wet Adhesion of Aromatized and Unaromatized Polymers, Before and After Curing - MIL 6301

| Polymers | Before Curing Cold $H_2O$ 24 hrs. | Before Curing Boiling $H_2O$ 24 hrs. | After Curing[1] Cold $H_2O$ 24 hrs. | After Curing[1] Boiling $H_2O$ 24 hrs. |
|---|---|---|---|---|
| (Unaromatized) | | | | |
| Example 5 | P[2] | F | P | P |
| Example 7 | P | F | P | P |
| Example 9 | P | P | P | P |
| Example 11 | P | F | P | P |
| Example 13 | P | P | P | P |
| Example 15 | P | P | P | P |
| (Aromatized) | | | | |
| Example 6 | P | F | P | P |
| Example 8 | P | F | P | P |
| Example 10 | P | P | P | P |
| Example 12 | P | F | P | P |
| Example 14 | P | F | P | P |
| Example 16 | P | P | P | P |

[1] Cured at 175° C. for 90 minutes in a vacuum oven.
[2] P = Passed, F = Failed.

polymers relative to their unaromatized counterparts.

The presence of the amide moiety in the polymers of Examples 5–10 is correlated with greater water permeability. However, upon curing, the rate of water-vapor transmission decreases for all polymers, regardless of their bisfuran component. This decrease in permeability is attributable to cross-linking during the thermal cure.

Focusing on the aromatized polymers, which may be considered the functional end products, it is evident that, for a given bis-furan monomer, the apparent thermal stability can be varied by varying the bis-maleimide structure: the order of apparent thermal stability ($T_d$) is aromatic bis-maleimide (Examples 6, 12) > aliphatic bismaleimide (Examples 8, 14) > siloxane-containing bis-maleimide (Examples 10, 16).

Moisture resistance, on the other hand, may be ranked in the opposite order: siloxane-containing bis-maleimide > aliphatic bis-maleimide > aromatic bis-maleimide. For a given bis-maleimide monomer, the absence of polar groups in the bis-furan confers greater moisture resistance.

Additional effects may be seen by comparing the properties of a given polymer before and after curing. Preliminary data show, for example, that curing increases wet adhesion for those polymer films that, prior to curing, did not withstand the test of 24 hours in boiling water. (Table 2).

It is interesting to note also that polymers prepared from siloxane-containing bis-maleimides with the siloxane containing bis-furan pass the exacting wet adhesion test after 24 hours in boiling water. This adds a new dimension to the tailoring of polyimide structures by the new approach.

The properties observed in the polymers herein disclosed are consistent with predictions that might have been made from chemical structures, and thus provide a valid conceptual basis for the design and synthesis of additional new polymers in this class, tailored to meet specific property requirements.

Although the invention has been described in detail with reference to specific embodiments, one skilled in the art will recognize that the specific disclosure can be modified in many ways without departing from the spirit and scope of the invention herein described.

We claim:

1. A method for preparing silicon-containing polyimide useful as conformal coatings, comprising polymerizing in a Diels-Alder reaction
   (a) a reactive diene that is a symmetrical siloxane-containing bis-furan derivative of the general formula:

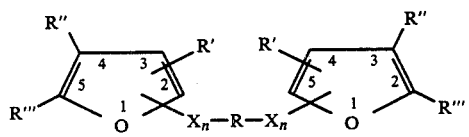

wherein $X_n$ is a divalent bridging group linked through position 2 or 3 of the furan rings, where n is 0 or 1, each R', R" and R''' is hydrogen or a hydrocarbon radical of 1 to 6 carbon atoms, and R is a polydimethyl siloxane segment of the general formula:

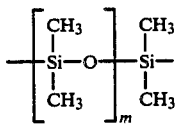

where m is 1–10, and
(b) a bis-maleimide dienophile of the general formula:

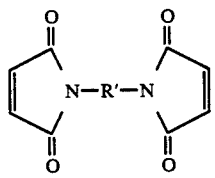

wherein R' is a divalent group of four (4) or more carbon atoms.

2. A method for preparing silicon-containing polyimide as recited in claim 1 wherein R' is

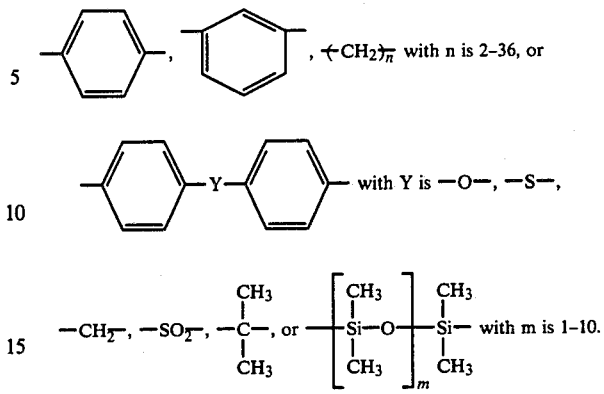

3. A method for preparing silicon-containing polyimide as recited in claim 1, further comprising aromatizing the Diels-Alder adduct by heating in acidic medium.

4. A method for preparing silicon-containing polyimide as recited in claim 2, wherein said aromatizing and said refluxing of said Diels-Alder adduct is in an acid selected from the group comprising acetic anhydride or glacial acetic acid.

5. A method for preparing silicon-containing polyimide as recited in claim 1 wherein said polymerizing of said bis-furan and bis-maleimide is by refluxing for 5–10 hours at 60–80 degrees C. in the presence of tetrahydrofuran.

6. A method for preparing silicon-containing polyimide as recited in claim 5 wherein said refluxing of said bis-furan and bis-maleimide is under nitrogen.

7. A silicon-containing polyimide useful as a conformal coating and formed as a product of a Diels-Alder reaction comprising the steps of
   (a) combining a siloxane-containing bis-furan derivative with a bis-maleimide in the presence of an inert solvent wherein the bis-furan derivative is of the general formula:

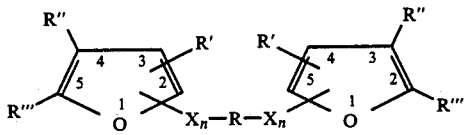

wherein $X_n$ is a divalent bridging group linked through position 2 or 3 of the furan rings, where n is 0 or 1, each R', R" and R''' is hydrogen or a hydrocarbon radical of 1 to 6 carbon atoms, and R is a polydimethyl siloxane segment of the general formula:

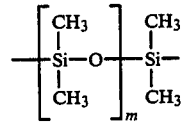

where m is 1–10;
(b) polymerizing said mixture by heating in an inert solvent, and
(c) aromatizing said polymer by heating in acid to form a polyimide having the general formula:

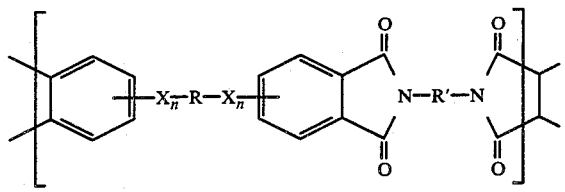

where $X_n$ is a divalent bridging group with n is 0 or 1, R is a siloxane segment of the general formula:

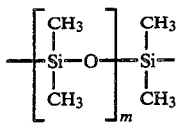

with m is 1–10, and R' is a divalent group of four or more carbon atoms, or said divalent group containing R units.

8. A silicon-containing polyimide useful as a conformal coating and formed as a product of a Diels-Alder reaction as in claim 7 wherein said polymerizing is conducted by heating in an inert solvent at a temperature of 60–80 degrees C. for 5–7 hours, or until polymerization is completed.

9. A silicon-containing polyimide useful as a conformal coating and formed as a product of a Diels-Alder reaction as in claim 7 wherein said aromatizing is by refluxing in an acid selected from the group comprising acetic anhydride or glacial acetic acid.

10. A silicon-containing polyimide useful as a conformal coating and formed as a product of a Diels-Alder reaction as in claim 7, wherein said siloxane containing bis-furan derivative has the general formula:

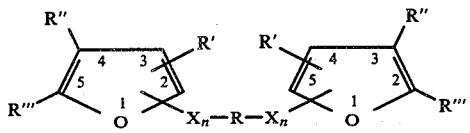

wherein $X_n$ is a divalent bridging group linked through position 2 or 3 of the furan rings, where n is 0 or 1, each R', R" and R'" is hydrogen or a hydrocarbon radical of 1 to 6 carbon atoms, and R is a polydimethyl siloxane segment of the general formula:

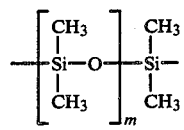

with m is 1–10.

* * * * *